US008565113B2

(12) United States Patent
Dhanapal

(10) Patent No.: US 8,565,113 B2
(45) Date of Patent: Oct. 22, 2013

(54) NETWORK EMULATION WITH VARYING BANDWIDTH AND/OR ERROR RATE

(75) Inventor: Karthikeyan Balaji Dhanapal, Bangalore (IN)

(73) Assignee: Infosys Limited, Bangalore (IN)

( * ) Notice: Subject to any disclaimer, the term of this patent is extended or adjusted under 35 U.S.C. 154(b) by 211 days.

(21) Appl. No.: 13/110,651

(22) Filed: May 18, 2011

(65) Prior Publication Data

US 2012/0236740 A1 Sep. 20, 2012

(30) Foreign Application Priority Data

Mar. 16, 2011 (IN) .............................. 807/CHE/2011

(51) Int. Cl.
*G01R 31/08* (2006.01)
*H04L 1/00* (2006.01)

(52) U.S. Cl.
USPC ....................................................... 370/252

(58) Field of Classification Search
None
See application file for complete search history.

(56) References Cited

U.S. PATENT DOCUMENTS

| 5,812,530 | A  | * | 9/1998  | Fernandez et al. | ............ | 370/250 |
| 5,886,907 | A  | * | 3/1999  | Abu-Amara et al. | ........... | 703/21  |
| 2002/0011848 | A1 | * | 1/2002  | Coffeen | ........................ | 324/547 |
| 2002/0150117 | A1 | * | 10/2002 | Baba | ............................. | 370/442 |
| 2006/0067351 | A1 | * | 3/2006  | Liu et al. | ....................... | 370/429 |
| 2008/0293439 | A1 | * | 11/2008 | Hus et al. | ...................... | 455/458 |

OTHER PUBLICATIONS

Rizzo, "Dummynet: a simple approach to the evaluation of network protocols," *ACM SIGCOMM Computer Communications Review*, vol. 27, No. 1, 11 pages, Jan. 1997.

Fall, "Network Emulation in the VINT/NS Simulator," in *IEEE International Symposium on Computers and Communications (ISCC)*, Red Sea, Egypt, 7 pages, Jul. 1999.
Carson and Santay, "NIST Net—A Linux-based Network Emulation Tool," *ACM SIGCOMM Computers Communications Review*, vol. 33, No. 3, 16 pages, Jul. 2003.
Zheng and Ni, "EMPOWER: A Network Emulator for Wireline and Wireless Networks," in *Proceedings of IEEE InfoCom*, 10 pages, 2003.
Kojo et al., "Seawind: a Wireless Network Emulator," in *Proceedings of* 11th *GI/ITG Conference on Measuring, Modeling and Evaluation of Computer and Communication*, 16 pages, 2001.
Fall and Varadhan, "The *ns* Manual," <http://www.isi.edu./nsnam/ns/doc/ns_doc.pdf>, 431 pages, May 9, 2010.
Judd and Steenkiste, "Using Emulation to Understand and Improve Wireless Networks and Applications," in *Proceedings of the* 2nd *conference on Symposium on Networked Systems Design & Implementation (NSDI)*, 14 pages, 2005.
Noble et al., "Trace-Based Mobile Newtork Emulation," in *Proceedings of ACM SIGCOMM*, Cannes, France, pp. 51-61, Sep. 1997.
Satoh, "Flying Emulator: Rapid Building and Testing of Networked Applications for Mobile Computer," in *Proceedings of the* 5th *International Conference on Mobile Agents*, 16 pages, 2001.

* cited by examiner

*Primary Examiner* — Chirag Shah
*Assistant Examiner* — Rina Pancholi
(74) *Attorney, Agent, or Firm* — Klarquist Sparkman, LLP

(57) ABSTRACT

Network emulation techniques are provided for dynamically varying network bandwidth and/or error rate. Network emulation can be performed by determining a bandwidth range, determining a plurality of specific bandwidth values distributed across the bandwidth range, and dynamically varying available bandwidth among the plurality of specific bandwidth values for a stream of network packets. Transitioning between specific bandwidth values can be performed using a probability jump matrix. Network emulation can also be performed by varying error rates, such as dropped packets, separately or in addition to dynamic bandwidth variation.

18 Claims, 6 Drawing Sheets

NETWORK EMULATION WITH VARYING BANDWIDTH AND/OR ERROR RATE

BACKGROUND

Recently there has been a surge in the number of wireless and mobile network devices and applications. For a developer of such devices and applications, it is important that the devices and applications be fully tested before being rolled out to the consumer. One important aspect of testing such devices and applications is to perform testing within the network environment in which the devices and applications will be operating.

In order to adequately test devices and applications in a network environment, a number of aspects should be considered. For example, network testing involves parameters outside the control of the device or application itself, such as network connectivity, available bandwidth, congestion, etc. Also, because of the shared nature of most wireless and wired networks, network parameters such as available bandwidth and congestion can vary from time to time. In addition, with wireless devices and applications, network conditions also vary as the devices and applications move through the environment.

Testing of devices and applications can involve simulation, emulation, live testing, or combinations. Live testing can be useful as it is done in a live environment with real-world conditions. However, with live testing, controllability and reproducibility are difficult to manage. Simulation can also be useful, and provides controllable, repeatable, and scalable testing. However, simulation does not necessarily reflect reality, or the varying conditions that will be encountered in a live environment. Emulation can provide a middle ground for testing, as it can be performed using actual devices and applications. However, emulation utilities typically provide only limited control over the testing environment, such as fixed values for parameters, such as fixed bandwidth.

Therefore, there exists ample opportunity for improvement in technologies related to network emulation for testing devices and/or applications.

SUMMARY

A variety of technologies related to network emulation for testing devices and/or applications are applied.

For example, a method for implementing a network emulator for emulating network conditions is described. The method comprises determining a bandwidth range, determining a plurality of specific bandwidth values distributed across the bandwidth range, and for a stream of network packets, dynamically varying available bandwidth among the plurality of specific bandwidth values according to a probability jump matrix associated with the plurality of specific bandwidth values.

As another example, a computer system for implementing a network emulator for emulating network conditions is described. The computer system comprises a processing unit, a memory, a network connection, and a computer-readable medium storing computer executable instructions implementing the network emulator which, when executed by the computer system, causes the computer system to perform operations, the operations comprising determining a bandwidth range, determining a plurality of specific bandwidth values distributed across the bandwidth range, and for a stream of network packets, dynamically varying available bandwidth among the plurality of specific bandwidth values according to a probability jump matrix associated with the plurality of specific bandwidth values.

As another example, a computer-readable storage medium storing computer-executable instructions for causing a computing device to perform a method for implementing a network emulator for emulating network conditions is described. The method comprises obtaining a maximum bandwidth value, obtaining a minimum bandwidth value, obtaining an average bandwidth value, and determining a plurality of specific bandwidth values distributed across the bandwidth range, where the bandwidth range is from the minimum bandwidth value to the maximum bandwidth value. The method further comprises, for each of the plurality of specific bandwidth values, determining an average sojourn time associated with the specific bandwidth value, and for a stream of network packets, dynamically varying available bandwidth among the plurality of specific bandwidth values according to a probability jump matrix associated with the plurality of specific bandwidth values, where the average sojourn time for each specific bandwidth value is determined such that the average bandwidth value is substantially maintained when emulating network conditions over a total time interval.

As another example, a computer-readable storage medium storing computer-executable instructions for causing a computing device to perform a method for implementing a network emulator for emulating network conditions is described. The method comprises obtaining a maximum error rate value, obtaining a minimum error rate value, obtaining an average error rate value, and determining a plurality of specific error rate values distributed across the error rate range, where the error rate range is from the minimum error rate value to the maximum error rate value. The method further comprises, for each of the plurality of specific error rate values, determining an average sojourn time associated with the specific error rate value, and for a stream of network packets, dynamically varying error rate among the plurality of specific error rate values according to a probability jump matrix associated with the plurality of specific error rate values, where the average sojourn time for each specific error rate value is determined such that the average error rate value is substantially maintained when emulating network conditions over a total time interval.

The foregoing and other features and advantages of the invention will become more apparent from the following detailed description, which proceeds with reference to the accompanying figures.

DETAILED DESCRIPTION OF EXEMPLARY EMBODIMENTS

The following description is directed to techniques and solutions for emulating network conditions, such as variations in bandwidth and/or error rate (e.g., dropped packets). The various techniques and solutions can be used in combination or independently. Different embodiments can implement one or more of the described techniques and solutions.

In the techniques and solutions described here, bandwidth and/or error rate can be dynamically varied within a corresponding bandwidth range and/or error rate range. If an average bandwidth value and/or average error rate value is specified, then the variation can be performed such that the average is maintained (e.g., maintained with some fluctuation). A Markov chain model can be used to model the dynamic variation in bandwidth and/or error rate by transitioning from one state (e.g., one specific bandwidth value) to another.

Network emulation is performed for a stream of network packets (e.g., network packets sent from and/or received by a device and/or application). The network packets can be Transmission Control Protocol/Internet Protocol (TCP/IP) packets, or other network protocol packets.

I. Environment for Providing Network Emulator

In the techniques and solutions described herein, a network emulator is provided for emulating network conditions, such as variations in bandwidth and/or error rate (e.g., dropped packets).

Figure 1:
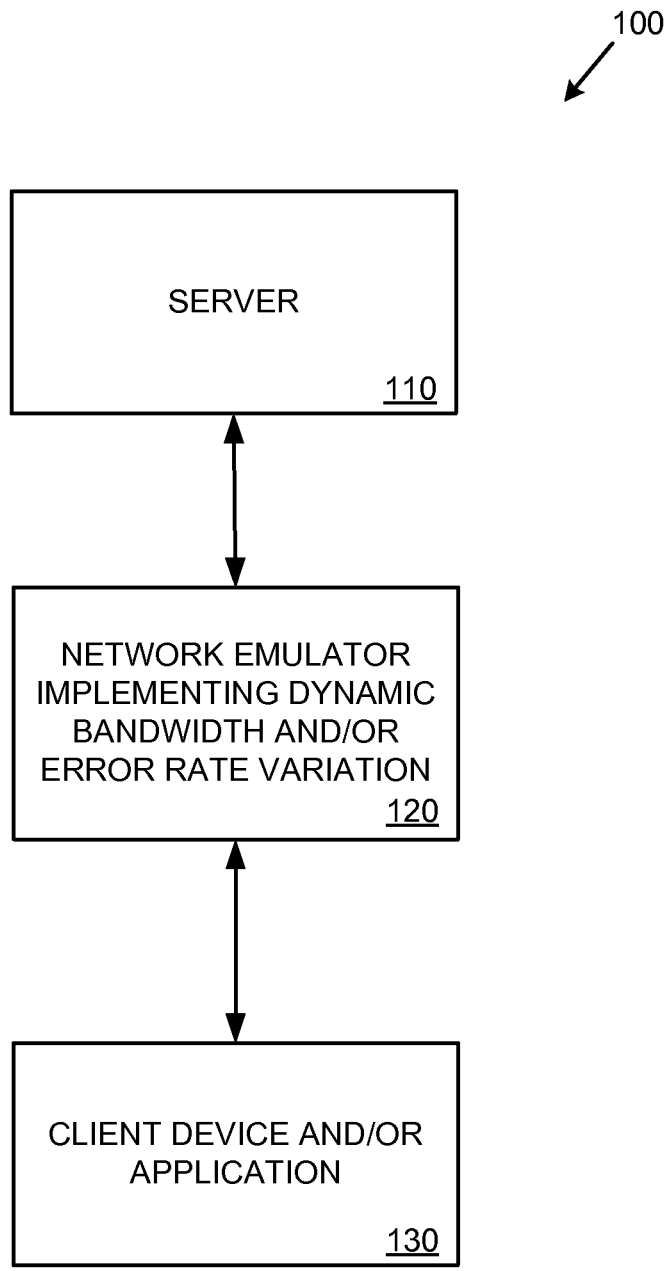
FIG. 1 is a block diagram depicting an example environment for implementing a network emulator.

FIG. 1 is a block diagram depicting an example environment 100 for implementing a network emulator. The environment includes a server 110 and a client device and/or application 130. The client device and/or application 130 communicates with the server 110 via communication network, such as a local area network (LAN), a wide area network (WAN) such as the Internet, a wireless network, a wired network, another type of network, or a combination of network types.

The client device and/or application 130 can be any type of computing device and/or software application. For example, the device/application 130 can be a desktop computer, laptop computer, tablet computer, smart phone, netbook, or any other type of computing device alone or in combination with software applications. The client device and/or application 130 can also be a device emulator (e.g., software emulating a specific computing device).

In the example environment 100, network traffic between the client device and/or application 130 and the server 110 passes through a network emulator 120. The network emulator emulates varying network conditions, such as variations in bandwidth and/or error rate. For example, the network emulator 120 performs one or more of the various dynamic bandwidth variation and/or dynamic error rate variation techniques described herein. The network emulator 120 can be implemented in hardware, software, or a combination.

Using the example environment 100, testing of applications and/or devices can be performed for different network conditions. For example, the example environment 100 can be implemented by a development department of a business or organization, such as a mobile device manufacturer or developer. The business or organization (or other entity) can implement the server 110, emulator 120, and client device/application 130 entirely within the business or organization so that testing can be performed internally using emulated network conditions without having to take the device and/or application into the field. The business or organization (or other entity) can also implement some of the components, such as the emulator 120 and client device and/or application 130, internally (e.g., emulate network conditions internally with the emulator 120 communicating with a live server on the Internet).

In an example situation, a mobile device developer may have to take the device out into the field to test how the device responds to variations in network conditions (e.g., bandwidth conditions and error rate conditions). Once in the field, the developer can test operation and responsiveness of the device in light of the current network conditions. After the field testing, the developer may implement changes or fixes for various issues discovered during the field testing, and repeat the process.

Instead of (or in addition to) field testing, a developer of a device or application can develop and test locally using the network emulation technologies described herein (e.g., the network emulator 120). Such a developer could test various network conditions that emulate the deployment environment of the device and/or application without having to take the device to the field. For example, the developer may be creating a device for deployment with a wireless carrier that provides a specific minimum and maximum bandwidth on the carrier's network. Those settings can be used by the developer to emulate the deployment network conditions locally (without having to go to the live field environment).

II. Bandwidth Range and Error Rate Range

In the techniques and solutions described herein, bandwidth and/or error rate ranges are used when emulating network conditions, such as variations in bandwidth and/or error rate (e.g., dropped packets).

A bandwidth range is used when dynamically varying available bandwidth. The bandwidth range can be a pre-determined value (e.g., a system-defined value) or a user-defined value. In some implementations, the bandwidth range is defined as the range between a minimum bandwidth value and a maximum bandwidth value. For example, a bandwidth range from 200 Kbps (kilobits per second) to 800 Kbps can be specified by a minimum bandwidth value of 200 Kbps and a maximum bandwidth value of 800 Kbps.

Additional bandwidth ranges can be used in situations where it is desirable to emulate network conditions with a disjoint range (e.g., to emulate a real-world environment where disjoint ranges may occur). In an example where two bandwidth ranges are used, the first bandwidth range could be from 200 Kbps to 400 Kbps, and the second bandwidth range could be from 600 Kbps to 800 Kbps. In other situations, more than two bandwidth ranges could be used.

In a specific implementation, an average bandwidth value is also specified. The average bandwidth value can be a pre-determined value or a user-defined value. For example, for a bandwidth range of 200 Kbps to 800 Kbps, a user-defined average bandwidth value could be 500 Kbps. The average bandwidth value does not have to be in the middle of the range. For example, the average bandwidth value for the example range could be 400 Kbps or 600 Kbps. The average bandwidth value can represent an average to be achieved over a total testing time.

Similar to the bandwidth range, an error rate range can be used when dynamically varying network error rate (alone or in combination with dynamic bandwidth variation). The error rate represents dropped or lost network packets. The error rate range can be a pre-determined value (e.g., a system-defined value) or a user-defined value. In some implementations, the error rate range is defined as the range between a minimum error rate value and a maximum error rate value. For example, an error rate range from 10% (e.g., 10% dropped packets) to 30% can be specified by a minimum error rate value of 10% and a maximum error rate value of 30%.

In a specific implementation, an average error rate value is also specified. The average error rate value can be a predetermined value or a user-defined value. For example, for an error rate range of 10% to 30%, a user-defined average error rate value could be 20%. The average error rate value does not have to be in the middle of the range. For example, the average error rate value for the example range could be 15% or 25%.

III. Bandwidth Values and Error Rate Values

In the techniques and solutions described herein, specific bandwidth values (bandwidth states) and/or specific error rate values (error rate states) are used when emulating network conditions, such as variations in bandwidth and/or error rate (e.g., dropped packets).

Specific bandwidth values can be determined from a bandwidth range. For example, specific bandwidth values can be distributed across a bandwidth range (e.g., distributed evenly, randomly, in a pre-defined pattern, or user-defined). For example, specific bandwidth values for a bandwidth range of 200 Kbps to 800 Kbps can be 200 Kbps, 300 Kbps, 400 Kbps, 500 Kbps, 600 Kbps, 700 Kbps, and 800 Kbps.

In a specific implementation, a bandwidth range, specified by a minimum bandwidth MinBw and a maximum bandwidth MaxBw, is divided into bandwidth states (each state associated with a specific bandwidth value) as follows:

$$Bw(0) = MinBw$$
$$Bw(1) = MinBw + Delta$$
$$...$$
$$Bw(k-1) = MinBw + (k-1)*Delta$$
$$Bw(k) = MinBw + k*Delta$$

Where the states (specific bandwidth values) are represented by Bw(i), the number of states=k+1, and Delta=(MaxBw−MinBw)/k. For example, for a bandwidth range from MinBw 100 Kbps to MaxBw 500 Kbps with five states (k=4) and Delta=100 Kbps, the following bandwidth states are obtained:

Bw(0)=100 Kbps
Bw(1)=200 Kbps
Bw(2)=300 Kbps
Bw(3)=400 Kbps
Bw(4)=500 Kbps

Specific error rate values can be determined from an error rate range. For example, specific error rate values can be distributed across an error rate range (e.g., distributed evenly, randomly, in a pre-defined pattern, or user-defined). For example, specific error rate values for an error rate range of 10% to 50% can be 10%, 15%, 20%, 30%, 40% and 50%.

In a specific implementation, an error rate range, specified by a minimum error rate MinEr and a maximum error rate MaxEr, is divided into error rate states (each state associated with a specific error rate value) as done in the above implementation for specific bandwidth values, as follows:

$$Er(0) = MinEr$$
$$Er(1) = MinEr + Delta$$
$$...$$
$$Er(k-1) = MinEr + (k-1)*Delta$$
$$Er(k) = MinEr + k*Delta$$

Where the states (specific error rate values) are represented by Er(i), the number of states=k+1, and Delta=(MaxEr−MinEr)/k. For example, for an error rate range from MinEr 10% to MaxEr 50% with five states (k=4) and Delta=10%, the following error rate states are obtained:

Er(0)=10%
Er(1)=20%
Er(2)=30%
Er(3)=40%
Er(4)=50%

A network emulator can allocate available bandwidth and/or set an error rate based on a current state of a Markov chain. When the Markov chain is in state $i \in \{0, 1, 2, \ldots k\}$, bandwidth Bw(i) and/or error rate Er(i) will be allocated during the state. The Markov chain model can be used to model different types of bandwidth and/or error rate fluctuation. For example, values of sojourn time, probability jump matrix values, and stationary vector PI, can be calculated as discussed in the following sections.

IV. Probability Jump Matrix

In the techniques and solutions described herein, a probability jump matrix is used to move between states when emulating network conditions, such as variations in bandwidth and/or error rate (e.g., dropped packets).

A probability jump matrix comprises probabilities for transitioning between different bandwidth and/or error rate states. In a specific implementation, the probability jump matrix Q comprises probabilities P(i,j) for jumping from state i to state j. The probability jump matrix Q can be defined as follows.

$$Q = \begin{pmatrix} P(0,0) & P(0,1) & \ldots & P(0,k) \\ P(1,0) & P(1,1) & \ldots & P(1,k) \\ \ldots & \ldots & & \ldots \\ P(k,0) & P(k,1) & \ldots & P(k,k) \end{pmatrix}$$

Using the probability jump matrix Q, a probability for jumping from each state to every other state can be specified. For example, if there are four states (k=3), then the probability jump matrix Q contains 16 entries.

The probability jump matrix Q can be a pre-defined matrix or a user-defined matrix. In addition, certain entries in the matrix can be set to zero (0) so that the system will not enter that state.

By setting different probability values for the probability jump matrix Q entries, different variations in bandwidth and/or error rate can be influenced. For example, probabilities can be set such that lower bandwidth (or error rate) states are more likely to be selected. As another example, increased fluctuation can be influenced by setting higher probabilities for jumping between states that are farther apart than those that are closer together.

Below is an example probability jump matrix Q (Example Matrix) containing probabilities for transitioning between five bandwidth states.

$$\text{Example Matrix} = \begin{pmatrix} 0.0 & 0.2 & 0.2 & 0.3 & 0.3 \\ 0.2 & 0.0 & 0.4 & 0.1 & 0.3 \\ 0.3 & 0.1 & 0.0 & 0.4 & 0.2 \\ 0.3 & 0.4 & 0.1 & 0.0 & 0.2 \\ 0.2 & 0.3 & 0.3 & 0.2 & 0.0 \end{pmatrix}$$

Using the above probability jump matrix, the probability of jumping from state 0 to state 0, P(0,0), is 0% (i.e., state 0 will not transition back to state 0; that transition is restricted). The probability of jumping from state 0 to state 1, P(0,1), is 20%, and so on.

Using the probability jump matrix, network emulation can be performed with dynamic variation of bandwidth and/or error rate. For example, a start state can be selected (e.g., pre-defined, user-defined, or random). Bandwidth and/or error rate can be set according to the start state (e.g., a start state of 0 could correspond to a bandwidth value of 100 Kbps). Once the emulator spends some amount of time in the start state (e.g., a pre-determined time period, a user-defined time period, a random time period, etc.), a new state is selected. For example, using the Example Matrix above, state 0 has a 20% chance of transitioning to state 1, a 20% chance of transitioning to state 2, a 30% chance of transitioning to state 3, and a 30% chance of transitioning to state 4. Using the Example Matrix, the emulator will randomly transition to the next state according to these probabilities. For example, the emulator could transition from a start state of 0 to a next state of 3, which could correspond to a bandwidth of 400 Kbps. After another period of time, the emulator would transition to the next state, and so on. The emulator can stop once a certain amount of time has elapsed (e.g., after a pre-defined total time period or a user-defined total time period).

In a specific implementation, the amount of time spent in a specific state is calculated as follows. For each state i there is a corresponding parameter $SJ(i)$, representing the average sojourn time for state i, $SJ(i)>0$. When the emulator enters state i, the emulator spends an amount of time calculated from $SJ(i)$ in state i before transitioning to the next state. The actual amount of time spent in state i is the calculated (or instantaneous) sojourn time, which is a calculated random sojourn time that is generated from an exponential distribution with $1/SJ(i)$ as the mean value.

$$S=[SJ(0),SJ(1),SJ(2)\ldots SJ(k)]$$

For small values of $SJ(i)$, jumps will be quicker and hence a higher degree of variation will be present.

V. Average Bandwidth and Error Rate Values

In the techniques and solutions described herein, an average bandwidth value and/or an average error rate value can be specified. When an average value is specified (e.g., a system-calculated average or user-defined average), the dynamic bandwidth and/or error rate variation is performed such that the average over time satisfies the average (e.g., is substantially equal to the average, or approximates the average). For example, a system-defined average value can be calculated as: $(Max+Min)/2$. It should be understood that an average value is an optional parameter, and is not required for performing network emulation with dynamic variation of bandwidth and/or error rate.

When an average value is specified, the average sojourn time (as defined in section IV above) $SJ(i)$ is determined in such a way that the average bandwidth and/or error rate criteria is satisfied. In a specific implementation, the following equation (Equation 1) is used to calculate the average $SJ(i)$. While Equation 1 is written in terms of bandwidth for illustration, it also applies to error rate.

$$\sum_{i=0}^{k} PI(i)*SJ(i)*(Bw(i)-AvBw) = 0 \quad \text{Equation 1}$$

In Equation 1, $\Sigma PI(i)=1$, $PI(i)>0$, AvBw is the average bandwidth, and $Bw(i)$ is the bandwidth value allocated for state i.

To determine values for $SJ(i)$, values for $PI(i)$ need to be determined by solving the following equations.

$$PI*(Q-I)=0 \text{ and } \Sigma PI(i)=1 \text{ where } PI=[PI(0),PI(1),PI(2),\ldots PI(k)]$$

Because Equation 1 has k unknown variables, an infinite number of solutions will satisfy Equation 1. For example, the following equation can be determined:

$$SJ(i)=1/PI(i)*1/|Bw(i)-AvBw|*1/M$$

whenever $(Bw(i)-AvBw)<0$ and M represents the total number of elements satisfying the $Bw(i)-AvBw<0$ condition. And, the corresponding equation can be determined:

$$SJ(i)=1/PI(i)*1/|Bw(i)-AvBw|*1/N$$

whenever $(Bw(i)-AvBw)>0$ and N represents the total number of elements satisfying the $Bw(i)-AvBw>0$ condition. $SJ(i)$ can take any value for the $Bw(i)-AB=0$ case.

It should be understood that some of the $SJ(i)$ values can be large values (e.g., when Bw-AvBw is close to zero) when compared to the other states, thus spending a large amount of time in one state when compared to the others. To more evenly distribute sojourn time between the states, $SJ(i)$ values can be found that not only satisfy Equation 1, but also result in a small difference between the maximum $SJ(i)$ and the minimum $SJ(i)$.

The following is an example calculation for average $SJ(i)$ values using PI, Q, $Bw(i)$, and AvBw. In this example calculation, there are five bandwidth states. Using the Example Matrix for Q, the PI vector for this example is calculated by solving the equation $PI*[Q-I]=0$, where I is the identity matrix. In this example, the PI vector is determined to be:

$$PI=[0.2,0.2,0.2,0.2,0.2]$$

Using a minimum bandwidth value of 100 Kbps, a maximum bandwidth value of 500 Kbps, and an average bandwidth value (AvBw) of 300 Kbps, the following five bandwidth states are determined:

Bw(0)=100 Kbps
Bw(1)=200 Kbps
Bw(2)=300 Kbps
Bw(3)=400 Kbps
Bw(4)=500 Kbps

Two of these bandwidth states (states 0 and 1) satisfy $Bw(i)-AvBw<0$. Two of these bandwidth states (states 3 and 4) satisfy $Bw(i)-AvBw>0$. And, one of these bandwidth states (state 2) satisfies $Bw(i)-AvBw=0$.

The next step in the example calculation for average $SJ(i)$ values is to calculate:

$$SJ(i)=1/PI(i)*1/|Bw(i)-AvBw|*1/M$$

whenever $(Bw(i)-AvBw)<0$ and M represents the total number of elements satisfying the $Bw(i)-AvBw<0$ condition. For the $Bw(i)$ values in this example, M=2 (states 0 and 1). So, $|Bw(0)-AvBw|=|-200|=200$, and $|Bw(1)-AvBw|=|-100|=100$. Therefore, SJ(0) and SJ(1) are calculated as follows:

$$SJ(1)=1/0.2*1/200*1/2=1/80$$

$$SJ(2)=1/0.2*1/100*1/2=1/40$$

The next step in the example calculation for average $SJ(i)$ values is to calculate:

$$SJ(i)=1/PI(i)*1/|Bw(i)-AvBw|*1/N$$

whenever $(Bw(i)-AvBw)>0$ and N represents the total number of elements satisfying the $Bw(i)-AvBw>0$ condition. For the $Bw(i)$ values in this example, N=2 (states 3 and 4). So, $|Bw(3)-AvBw|=|100|=100$, and $|Bw(4)-AvBw|=200|=200$. Therefore, SJ(3) and SJ(4) are calculated as follows:

$$SJ(3)=1/0.2*1/100*1/2=1/40$$

$$SJ(4)=1/0.2*1/200*1/2=1/80$$

The next step in the example calculation for average SJ(i) values where Bw(i)−AvBw=0. In this example, SJ(2) is calculated as (Max SJ(i)+Min SJ(i))/2=(1/80+1/40)/2=3/160.

By multiplying all SJ(i) values by a constant value of 10,000, the following average SJ values are obtained. It should be understood that any constant value can be used, depending on the desired scale of the values.

SJ(0)=125
SJ(1)=250
SJ(2)=188
SJ(3)=250
SJ(4)=125

As can be understood from the above average SJ values, the network emulator will spend, on average, twice as much time in state 1 as it does in state 0.

The above example calculation for average SJ(i) values can be performed in the same manner for error rates. For example, the calculation can be performed using a minimum error rate of 10%, a maximum error rate of 50%, an average error rate of 30%, and five error rate states:

Er(0)=10%
Er(1)=20%
Er(2)=30%
Er(3)=40%
Er(4)=50%

The remaining calculations can then be performed as shown above with regard to bandwidth, using the same PI vector and Example Matrix.

VI. Example Bandwidth Allocation

This section describes an example dynamic bandwidth allocation scenario. In this example, a bandwidth range of 100 Kbps to 500 Kbps, with an average of 300 Kbps, is used. The probability jump matrix Q is defined by the Example Matrix. The PI vector is [0.2, 0.2, 0.2, 0.2, 0.2]. The bandwidth states are:

Bw(0)=100 Kbps
Bw(1)=200 Kbps
Bw(2)=300 Kbps
Bw(3)=400 Kbps
Bw(4)=500 Kbps

The following average sojourn times are calculated:

SJ(0)=500
SJ(1)=200
SJ(2)=600
SJ(3)=200
SJ(4)=500

In this example, a random state is chosen as the start state. The random start state 4 is chosen. Based on SJ(4), the network emulator will generate a calculated (instantaneous) sojourn time. In this example, calculated random sojourn time is generated, using the average sojourn times above, from an exponential distribution with 1/SJ(i) as the mean value. The calculated sojourn time will determine how long bandwidth Bw(4) (500 Kbps in this example) will be allocated by the emulator. In this example, the calculated sojourn time is 700 ms. Therefore, the emulator will allocate 500 Kbps for 700 ms (i.e., from time period 0 to 700 ms).

The next state is then chosen to apply after 700 ms has been spent in state 4. The fifth row of the Example Matrix is used to determine which state the emulator will transition to using the probability values. In this example, the emulator chooses state 1, and will stay in state 1 for a calculated sojourn time of 150 ms (based on SJ(1)). The emulator will thus allocate 200 Kbps of bandwidth for 150 ms (from time 700 ms to time 850 ms).

The next state chosen is state 2. The emulator will stay in state 2 for a calculated sojourn time of 500 ms (based on SJ(2)). The emulator will allocate 300 Kbps for 500 MS (from time 850 ms to time 1350 ms).

The next state chosen is state 0. The emulator will stay in state 0 for a calculated sojourn time of 800 ms (based on SJ(0)). The emulator will allocate 100 Kbps for 800 MS (from time 1350 ms to time 2150 ms).

The next state chosen is state 3. The emulator will stay in state 3 for a calculated sojourn time of 300 ms (based on SJ(3)). The emulator will allocate 400 Kbps for 300 MS (from time 2150 ms to time 2450 ms).

The emulator will continue to transition from one state to another until the testing is complete.

Figure 5:
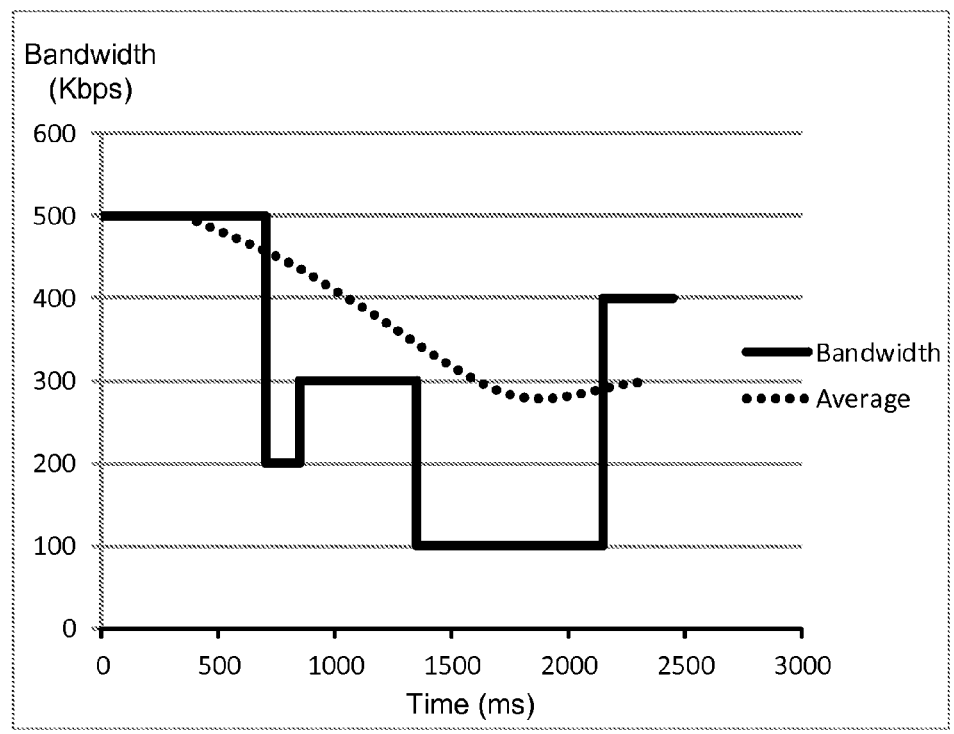
FIG. 5 is a graph depicting example bandwidth variation over time.

FIG. 5 is a graph 500 depicting the example bandwidth allocation scenario in this section. As in this example, the graph 500 depicts the bandwidth variation for the various time intervals. For example, the graph 500 depicts that the emulator spends 700 ms (from time 0 to 700 ms) at 500 Kbps bandwidth, transitions to 200 Kbps for 150 ms (from time 700 ms to time 850 ms), and so on.

In addition, the graph 500 depicts the calculated average bandwidth (the dotted line). As can be seen from the graph 500, the calculated average bandwidth (as calculated from the actual bandwidth values in this example) closely approaches the desired average of 300 Kbps over time.

VII. Methods for Emulating Network Conditions

In the techniques and solutions described herein, methods for emulating network conditions, such as variations in bandwidth and/or error rate (e.g., dropped packets), are provided.

Figure 2:
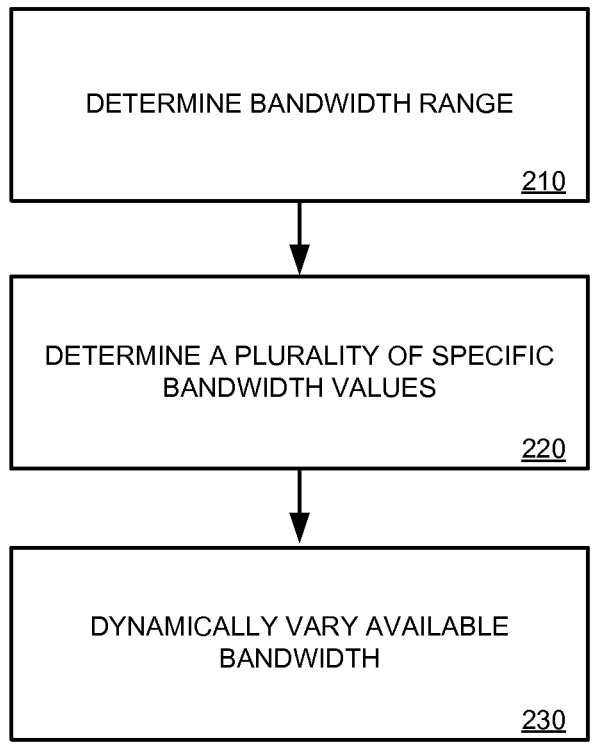
FIG. 2 is a flowchart showing an example method for implementing a network emulator for emulating variation in network bandwidth.

FIG. 2 is a flowchart showing an example method 200 for implementing a network emulator for emulating network conditions. For example, the method 200 can be implemented by the network emulator depicted at 120 in FIG. 1.

At 210, a bandwidth range is determined. The bandwidth range is a range of network bandwidth. In a specific implementation, the bandwidth range is specified as the bandwidth range between a minimum network bandwidth value and a maximum network bandwidth value. The bandwidth range can be a pre-determined value (e.g., a system-defined value) or a user-defined value. In a specific implementation, a user enters the minimum and maximum network values. For example, the user may enter a minimum bandwidth value of 200 Kbps (kilobits per second) and a maximum bandwidth value of 800 Kbps, resulting in a bandwidth range from 200 Kbps to 800 Kbps.

At 220, a plurality of specific bandwidth values are determined. The specific bandwidth values are distributed across the determined bandwidth range 210. Various techniques can be used to determine the specific bandwidth values. For example, the specific bandwidth values can be evenly distributed across the bandwidth range, they can be randomly distributed, or they can be user-defined. Each specific bandwidth value is associated with a corresponding bandwidth state.

At 230, available bandwidth is dynamically varied for a stream of network packets according to a probability jump matrix. The probability jump matrix comprises probabilities for transitioning between specific bandwidth values of the plurality of specific bandwidth values. In a specific implementation, the probability jump matrix contains probability values for jumping from any given specific bandwidth value to all other bandwidth values, of the plurality of specific bandwidth values.

Figure 3:
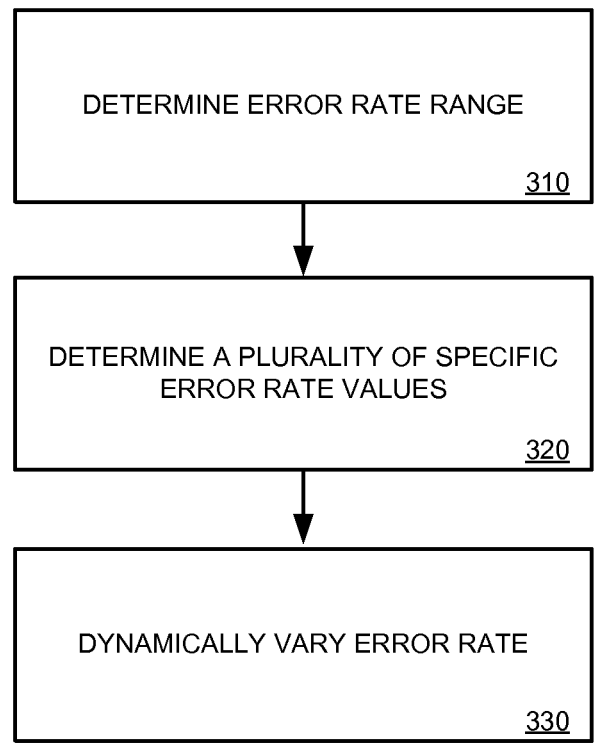
FIG. 3 is a flowchart showing an example method for implementing a network emulator for emulating variation in network error rate.

FIG. 3 is a flowchart showing an example method 300 for implementing a network emulator for emulating network conditions. For example, the method 300 can be implemented by the network emulator depicted at 120 in FIG. 1.

At 310, an error rate range is determined. In a specific implementation, the error rate range is specified as the error rate range between a minimum network error rate and a maximum network error rate. The error rate range can be a pre-determined value (e.g., a system-defined value) or a user-defined value. In a specific implementation, a user enters the minimum and maximum error rate values. For example, the user may enter a minimum error rate value of 10% and a maximum error rate value of 30%, resulting in an error rate range from 10% to 30%.

At 320, a plurality of specific error rate values are determined. The specific error rate values are distributed across the determined error rate range 310. Various techniques can be used to determine the specific error rate values. For example, the specific error rate values can be evenly distributed across the error rate range, they can be randomly distributed, or they can be user-defined. Each specific error rate value is associated with a corresponding error rate state.

At 330, error rate is dynamically varied for a stream of network packets according to a probability jump matrix. The probability jump matrix comprises probabilities for transitioning between specific error rate values of the plurality of specific error rate values. In a specific implementation, the probability jump matrix contains probability values for jumping from any given specific error rate value to all other error rate values, of the plurality of specific error rate values.

The methods 200 and 300 can be implemented separately or as a combined implementation.

Figure 4:
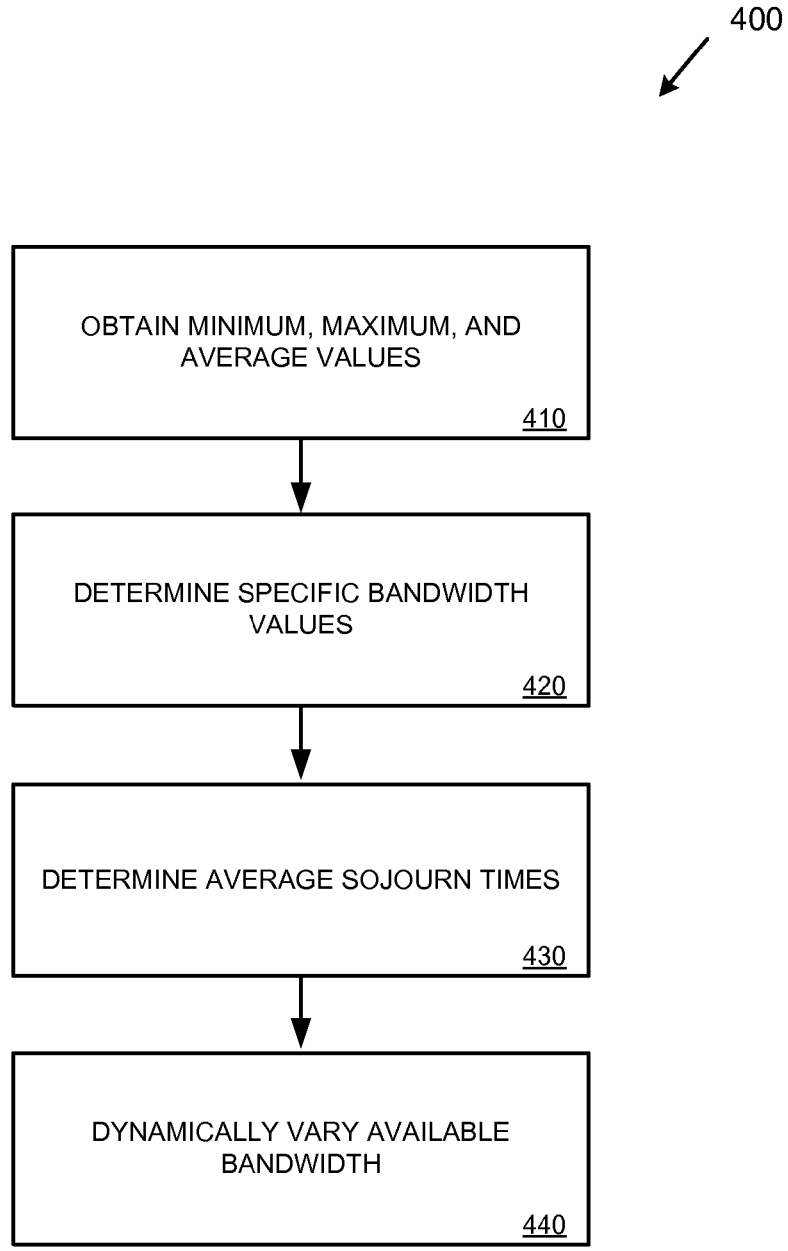
FIG. 4 is a flowchart showing an example method for implementing a network emulator for emulating variation in network bandwidth using an average bandwidth value and average sojourn times.

FIG. 4 is a flowchart showing an example method 400 for implementing a network emulator for emulating network conditions, including variation in network bandwidth using an average bandwidth value and average sojourn times. For example, the method 400 can be implemented by the network emulator depicted at 120 in FIG. 1.

At 410, minimum, maximum, and average network bandwidth values are obtained. For example, the values can be pre-defined or entered by a user.

At 420, a plurality of specific bandwidth values are determined. The specific bandwidth values are distributed across a bandwidth range defined by the minimum and maximum bandwidth values 410.

At 430, average sojourn times are determined. An average sojourn time is determined for each of the plurality of specific bandwidth values 420. The average sojourn times are determined in such a way that the average bandwidth value 410 is substantially maintained (e.g., when emulating network conditions over a total time period). In a specific implementation, Equation 1 is used to determine the average sojourn times. From the average sojourn times 430, instantaneous sojourn times can be calculated using, for example, an exponential distribution.

At 440, available bandwidth is dynamically varied, for a stream of network packets, among the plurality of specific bandwidth values 420 according to a probability jump matrix.

The method 400 can also be applied to error rates.

VIII. Example Computing Device

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 6:
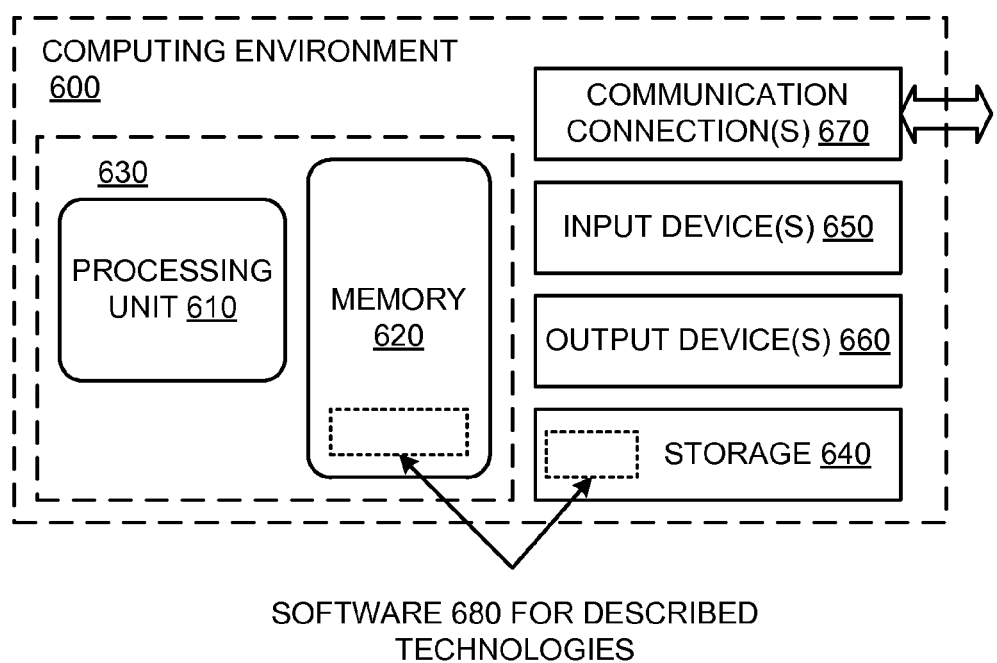
FIG. 6 is a block diagram showing an example computing device.

FIG. 6 illustrates a generalized example of a suitable computing environment 600 in which described embodiments, techniques, and technologies may be implemented. The computing environment 600 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 6, the computing environment 600 includes at least one central processing unit 610 and memory 620. In FIG. 6, this most basic configuration 630 is included within a dashed line. The central processing unit 610 executes computer-executable instructions. In a multi-processing system, multiple processing units execute computer-executable instructions to increase processing power and as such, multiple processors can be running simultaneously. The memory 620 may be volatile memory (e.g., registers, cache, RAM), non-volatile memory (e.g., ROM, EEPROM, flash memory, etc.), or some combination of the two. The memory 620 stores software 680 that can, for example, implement the technologies described herein. A computing environment may have additional features. For example, the computing environment 600 includes storage 640, one or more input devices 650, one or more output devices 660, and one or more communication connections 670. An interconnection mechanism (not shown) such as a bus, a controller, or a network, interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other tangible storage medium which can be used to store information and which can be accessed within the computing environment 600. The storage 640 stores instructions for the software 680, which can implement technologies described herein.

The input device(s) 650 may be a touch input device, such as a keyboard, keypad, mouse, pen, or trackball, a voice input device, a scanning device, or another device, that provides input to the computing environment 600. For audio, the input device(s) 650 may be a sound card or similar device that accepts audio input in analog or digital form, or a CD-ROM reader that provides audio samples to the computing environment 600. The output device(s) 660 may be a display, printer, speaker, CD-writer, or another device that provides output from the computing environment 600.

The communication connection(s) 670 enable communication over a communication medium (e.g., a connecting network) to another computing entity. The communication medium conveys information such as computer-executable instructions, compressed graphics information, or other data in a modulated data signal.

IX. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 620 and/or storage 640. As should be readily understood, the term computer-readable media does not include communication connections (e.g., 670) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. I therefore claim as my invention all that comes within the scope and spirit of these claims.

I claim:

1. A method, implemented at least in part by a computing device, for implementing a network emulator for emulating network conditions, the method comprising:
    determining, by the computing device, a bandwidth range;
    determining, by the computing device, a plurality of specific bandwidth values distributed across the bandwidth range; and
    for a stream of network packets, emulating network conditions by dynamically varying, by the computing device, available bandwidth among the plurality of specific bandwidth values according to a probability jump matrix associated with the plurality of specific bandwidth values, wherein the dynamically varying available bandwidth comprises constraining bandwidth for the stream of network packets according to the plurality of specific bandwidth values by:
        for each of a plurality of different time intervals, selecting, according to the probability jump matrix, a specific bandwidth value to apply from the plurality of specific bandwidth values.

2. The method of claim 1 further comprising:
    obtaining, by the computing device, a maximum bandwidth value; and
    obtaining, by the computing device, a minimum bandwidth value;
    wherein the bandwidth range is from the minimum bandwidth value to the maximum bandwidth value.

3. The method of claim 1 further comprising:
    partitioning, by the computing device, the bandwidth range into a plurality of non-overlapping bandwidth intervals, each of the plurality of non-overlapping bandwidth intervals assigned a bandwidth state identifier, and each of the plurality of specific bandwidth values corresponding to a respective one of the plurality of non-overlapping bandwidth intervals.

4. The method of claim 1 wherein the stream of network packets is received by the network emulator from a software application running on a client computing device or device emulator.

5. The method of claim 1 wherein the dynamically varying available bandwidth comprises:
    providing available bandwidth of a first specific bandwidth value of the plurality of specific bandwidth values during a first time period, the first time period generated from a first average sojourn time associated with the first specific bandwidth value; and
    providing available bandwidth of a second specific bandwidth value of the plurality of specific bandwidth values during a second time period, the second time period generated from a second average sojourn time associated with the second specific bandwidth value.

6. The method of claim 1 wherein the probability jump matrix comprises probabilities for switching from one specific bandwidth value to another specific bandwidth value of the plurality of specific bandwidth values.

7. The method of claim 1 wherein the probability jump matrix comprises a probability value for transitioning from each specific bandwidth value to all other specific bandwidth values of the plurality of specific bandwidth values.

8. The method of claim 1 further comprising:
obtaining, by the computing device, an average bandwidth value;
wherein the dynamically varying available bandwidth comprises constraining bandwidth for the stream of network packets according to the plurality of specific bandwidth values by, for each specific bandwidth value of the plurality of specific bandwidth values:
determining an average sojourn time for the specific bandwidth value, the average sojourn time indicating an amount of time to spend in a state associated with the specific bandwidth value when the specific bandwidth value state is entered;
wherein the average sojourn time for each specific bandwidth value is determined such that the average bandwidth value is substantially achieved over a total time interval.

9. The method of claim 1 further comprising:
determining, by the computing device, an error rate range;
determining, by the computing device, a plurality of specific error rate values distributed across the error rate range; and
for the stream of network packets, dynamically varying error rate among the plurality of specific error rate values according to a probability jump matrix associated with the plurality of specific error rate values.

10. A computer system implementing a network emulator for emulating network conditions, the computer system comprising:
a processing unit;
a memory;
a network connection; and
a computer-readable medium storing computer executable instructions implementing a network emulator which, when executed by the computer system, causes the computer system to perform operations comprising:
determining a bandwidth range;
determining a plurality of specific bandwidth values distributed across the bandwidth range; and
for a stream of network packets, emulating network conditions by dynamically varying available bandwidth among the plurality of specific bandwidth values according to a probability jump matrix associated with the plurality of specific bandwidth values, wherein the dynamically varying available bandwidth comprises constraining bandwidth for the stream of network packets according to the plurality of specific bandwidth values by:
for each of a plurality of different time intervals, selecting, according to the probability jump matrix, a specific bandwidth value to apply from the plurality of specific bandwidth values.

11. The computer system of claim 10 wherein the dynamically varying available bandwidth comprises:
providing available bandwidth of a first specific bandwidth value of the plurality of specific bandwidth values during a first time period, the first time period generated from a first average sojourn time associated with the first specific bandwidth value; and
providing available bandwidth of a second specific bandwidth value of the plurality of specific bandwidth values during a second time period, the second time period generated from a second average sojourn time associated with the second specific bandwidth value.

12. The computer system of claim 10, the operations further comprising:
obtaining an average bandwidth value;
wherein the dynamically varying available bandwidth comprises constraining bandwidth for the stream of network packets according to the plurality of specific bandwidth values by, for each specific bandwidth value of the plurality of specific bandwidth values:
determining an average sojourn time for the specific bandwidth value, the average sojourn time indicating an amount of time to spend in a state associated with the specific bandwidth value when the specific bandwidth value state is entered;
wherein the average sojourn time for each specific bandwidth value is determined such that the average bandwidth value is substantially achieved over a total time interval.

13. The computer system of claim 10, the operations further comprising:
determining an error rate range;
determining a plurality of specific error rate values distributed across the error rate range; and
for the stream of network packets, dynamically varying error rate among the plurality of specific error rate values according to a probability jump matrix associated with the plurality of specific error rate values.

14. A non-transitory computer-readable medium storing computer-executable instructions for causing a computing device to perform a method for implementing a network emulator for emulating network conditions, the method comprising:
obtaining a maximum error rate value;
obtaining a minimum error rate value;
obtaining an average error rate value;
determining a plurality of specific error rate values distributed across an error rate range, wherein the error rate range is from the minimum error rate value to the maximum error rate value;
for each of the plurality of specific error rate values, determining an average sojourn time associated with the specific error rate value; and
for a stream of network packets, emulating network conditions by dynamically varying error rate among the plurality of specific error rate values according to a probability jump matrix associated with the plurality of specific error rate values, wherein the average sojourn time for each specific error rate value is determined such that the average error rate value is substantially achieved when emulating network conditions over a total time interval.

15. The computer-readable medium of claim 14 wherein the stream of network packets is received by the network emulator from a software application running on a client computing device or device emulator.

16. The computer-readable medium of claim 14 wherein the dynamically varying error rate comprises applying error rate for the stream of network packets according to the plurality of specific error rate values by:
for each of a plurality of different time intervals, selecting, according to the probability jump matrix, a specific error rate value to apply from the plurality of specific error rate values.

17. The computer-readable medium of claim 14 wherein the dynamically varying error rate comprises:
applying error rate of a first specific error rate value of the plurality of specific error rate values for a first instantaneous sojourn time, wherein the first instantaneous sojourn time is calculated from the average sojourn time associated with the first specific error rate value; and applying error rate of a second specific error rate value of the plurality of specific error rate values for a second instantaneous sojourn time, wherein the second instantaneous sojourn time is calculated from the average sojourn time associated with the second specific error rate value.

18. The computer-readable medium of claim 14, the method further comprising:

obtaining a maximum bandwidth value;

obtaining a minimum bandwidth value;

obtaining an average bandwidth value;

determining a plurality of specific bandwidth values distributed across a bandwidth range, wherein the bandwidth range is from the minimum bandwidth value to the maximum bandwidth value;

for each of the plurality of specific bandwidth values, determining an average sojourn time associated with the specific bandwidth value; and for the stream of network packets, dynamically varying available bandwidth among the plurality of specific bandwidth values according to a probability jump matrix associated with the plurality of specific bandwidth values, wherein the average sojourn time for each specific bandwidth value is determined such that the average bandwidth value is substantially achieved when emulating network conditions over the total time interval.

* * * * *